United States Patent

[11] 3,584,513

| [72] | Inventor | Robert L. Gates<br>Ridgewood, N.J. |
|---|---|---|
| [21] | Appl. No. | 789,143 |
| [22] | Filed | Jan. 6, 1969 |
| [45] | Patented | June 15, 1971 |
| [73] | Assignee | Singer-General Precision, Inc.<br>Little Falls, N.J. |

[54] SELF-CALIBRATING SYSTEM FOR NAVIGATIONAL INSTRUMENTS
3 Claims, 7 Drawing Figs.

[52] U.S. Cl. ............................................. 74/5.34, 73/504
[51] Int. Cl. ............................................. G01c 19/02
[50] Field of Search ............................................. 74/5.34, 5, 504

[56] References Cited
UNITED STATES PATENTS

| 3,127,774 | 4/1964 | Fischer et al. | 74/5.34 X |
| 3,214,983 | 11/1965 | Dozier | 74/5.34 |
| 3,272,018 | 9/1966 | Watt | 74/5.34 |
| 3,352,164 | 11/1967 | Rosen | 74/5.34 |
| 3,398,586 | 8/1968 | Griffin et al. | 74/5.34 |

*Primary Examiner*—Manuel A. Antonakas
*Attorneys*—S. A. Giarratana and G. B. Oujevolk

ABSTRACT: A system for recovering the drift coefficients of two navigational gyros for a vehicle, each of the gyros having a rotatable outer casing and two input axes, wherein the gyros are positioned so that their spin axes extend at an angle to each other and a precession torque is applied to the gyros to maintain their spin axes in a predetermined spatial position. The casing of each gyro is rotated about an axis parallel to its spin axis to predetermined angular positions, so that a drift coefficient can be established for each input axis.

INVENTOR.
ROBERT L. GATES
BY
ATTORNEYS

INVENTOR.
ROBERT L. GATES

BY

ATTORNEYS 3,584,513

SELF-CALIBRATING SYSTEM FOR NAVIGATIONAL INSTRUMENTS

BACKGROUND OF THE INVENTION

This invention relates to a self-calibrating system for navigational instruments, and, more particularly, to such a system for rapid self-calibration of an azimuth gyro and a vertical gyro.

It is generally known to provide a navigation system for a space vehicle, or the like, consisting of a pair of gyros usually in the form of an azimuth gyro which controls the platform cluster of the vehicle about an azimuth (or vertical) axis, and a vertical gyro which controls the platform cluster about two perpendicular axes defining a plane perpendicular to the azimuth axis.

Several systems have been proposed to self-calibrate these types of instruments. For example, a redundant monitor gyro has been provided to explicitly calibrate the gyros by taking parallel and antiparallel rate measurements along the input axes, the monitor gyro being independent of the navigation loop and separately gimbled from the navigation gyros. However, this redundant system does not provide for a direct calibration of the azimuth gyro, and, of course, increases the size, cost, and complexity of the system.

Another class of prior art systems utilize spatial modulation of case fixed drift rates by continuously rotating the casing of the gyro, or by continuously rotating the cluster. This type of arrangement causes the drifts to be reduced by averaging their directional inputs within the navigation coordinate systems, and the drift coefficients of the gyros are not explicitly recovered. Also, these spatial modulation concepts have a slow calibration cycle, and the drift level of the instruments is disturbed due to the continuous rotation.

SUMMARY OF THE INVENTION

It is therefore an object of the present invention to provide a system for providing a direct self-calibration of an azimuth gyro and a vertical gyro which permits the drift coefficients of the gyros to be explicitly recovered.

It is a further object of the present invention to provide a direct self-calibration system for a vertical gyro and an azimuth gyro which minimizes disturbances and which, by eliminating the use of a redundant instrument, reduces the cost and complexity of the system.

Briefly summarized, the present invention is directed to an apparatus and method for recovering the drift coefficients of two navigational gyros for a vehicle, each of the gyros having a rotatable outer casing and two input axes, wherein the gyros are positioned so that their spin axes extend at an angle to each other, a precession torque is applied to said gyros to maintain their spin axes in a predetermined spatial position, and the casing of each gyro is rotated about an axis parallel to its spin axis to predetermined angular positions, to permit a drift coefficient to be established for each input axis.

BRIEF DESCRIPTION OF THE DRAWINGS

Reference is now made to the accompanying drawings for a better understanding of the nature and objects of the system of the present invention, which drawings illustrate the best mode presently contemplated for carrying out the objects of the invention and its principles and are not to be construed as restrictions or limitations on its scope. In the drawings.

DESCRIPTION OF THE PREFERRED EMBODIMENTS

Figure 1:
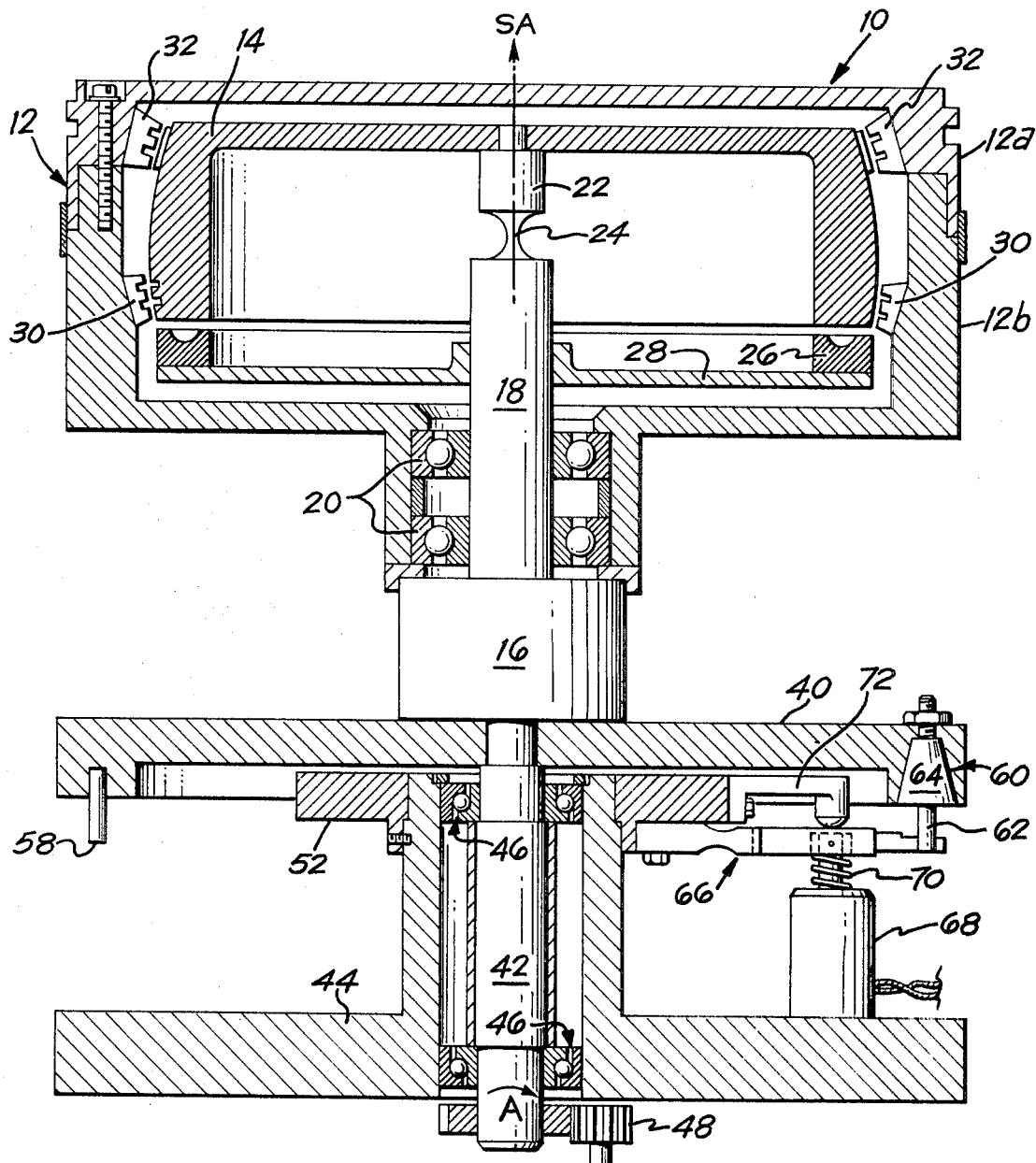
FIG. 1 is a vertical sectional view of a gyro which may be utilized in the system of the present invention, shown mounted on a turntable for stepped rotation.

FIG. 1 of the drawings depicts a gyro-turntable assembly according to the present invention. The gyro may be of any known two-degree-of-freedom design such as that disclosed in U.S. Pat. No. 3,077,785, which is assigned to the same assignee as the present application, and which will be disclosed by means of an example. Specifically, this gyro is shown, in general, by the reference numeral 10 and comprises an outer casing or housing 12 containing an inverted cup-shaped flywheel 14 of symmetrical configuration which is normally supported for high speed rotation about a substantially vertical central spin axis SA. The casing may be formed into two sections 12a and 12b, which are attached together by a plurality of bolts, or the like, as shown.

A drive means 16 is fixed to the housing 12 externally thereof and is adapted to spin the fly wheel 14 at a relatively high speed. The drive means 16 may be in the form of an electrical motor and has an elongated upright drive shaft 18 projecting upwardly through the bearings shown into the casing 12, and is directly connected to the fly wheel 14 at its rotative center by means of a flexure rod 22 having a symmetrically machined neck portion 24 intermediate the fly wheel and the motor shaft. The upper end of the flexure rod 22 is fastened to the fly wheel 14 and the lower end thereof may be integral with, or fastened to, the motor shaft 18.

As emphasized in the above mentioned patent, the function of the flexure rod 24 is to provide a positive rotative drive connection between the motor shaft 18 and the fly wheel 14 while permitting flexing or pivoting action therebetween about both coordinate axes perpendicular to the spin axis SA. Therefore, when the fly wheel 14 is rotated at a high speed by the motor 16 it serves as an effective two-degree-of-freedom gyro tending to maintain the same orientation in space with a slight tilting or pivoting of the casing 12 about either axes perpendicular to the normally vertical axis SA.

Means may be provided for compensating or balancing the spring torque provided by the neck portion 24 and is preferably in the form of a permanent magnet 26 supported on a circular disc or a series of arms 28 which are positioned underneath the fly wheel 14 and are connected to the motor shaft 18 to rotate with the fly wheel 14, the exact arrangement and operation being set forth in detail in the patent.

A plurality of torquers 30 are provided to precess the gyro fly wheel 14 for purposes of earth rate compensation and other earth navigational functions, the torquers being supported about the inside wall of the housing portion 12b and disposed circumferentially about the upper peripheral surface of the fly wheel 14. As provided for in the above patent, the torquers may be of the well-known type, and may be suitably energized to exert a resulting precessional force on the fly wheel 14.

Two pair of electrical pick off means 32 may be supported on the inside wall of the casing 12 to generate electrical signals proportional to the tilting or pivoting of the casing 12 about either of the sensitive axes. These pick off means may be of any known type, such as the E-bridge variety customarily used in similar arrangements.

Since the structural and operational features of the gyro disclosed above are specifically set forth in the above patent and will be apparent to anyone skilled in the art, they are omitted in the present application in the interest of brevity.

The gyro 10 is fixed with respect to a turnable 40 as shown in FIG. 1, by fixing the lower portion of the housing of the motor 16 to the upper portion of the turntable 40 as shown. This turntable may be of the type disclosed in applicant's U.S. Pat. No. 3,485,115 for "Rotary Position Mechanism," issued on Dec. 23, 1969, also assigned to the same assignee as the present invention, and includes a mechanism for indexing the turntable with a high degree of precision.

As disclosed in the latter patent, the turntable 40 has a central shaft 42 mounted for rotation in a flanged base member 44 by means of a plurality of bearings 46. A drive gear 48 is driven by means of a constantly energized motor 50, and is operatively connected to the shaft 42 to drive the turntable in a unidirectional sense.

A damping plate 52 is attached to the base member 44 by means of a plurality of set screws as shown. Although the aforementioned U.S. Pat. No. 3,485,115 provides a groove formed in the plate to receive a projection formed on the turntable for damping the rotational movement of the latter, it is understood that a gear driven sealed damping system would, more preferably, be used in the present invention. Since this latter system is well known, it is not shown in the drawings, in the interest of simplicity.

A rod 58 projects from a flange formed on the turntable and an adjustable stop assembly 60 also extends through the flange and is spaced at a predetermined angle from the rod 58, which interval is dependent on the desired interval of interrupted rotation of the turntable. The adjustable stop assembly 60 includes a rod 62 projecting from the flange formed on the turntable and machined eccentric to a tapered member 64 which is wedge locked into a corresponding tapered cavity formed in the flange. The adjustable stop assembly 60 is secured to the turntable 40 by means of a threaded rod and nut, as shown.

A stop member 66 is bolted at one end to the bottom of the damping plate 52, has a reduced thickness to render it flexible in the vertical plane while rigid in the horizontal plane, and has a free end portion which is cylindrical and notched. A solenoid 68 is carried by the flange portion of the base member 44 and has a movable plunger which is attached within a hole formed in the stop member 66, a spring 70 being provided which extends over the plunger and normally urges the stop member 66 in an upward direction. In order to maintain the stop member perfectly horizontal, an abutment member 72 may be provided which is bolted to the damping plate 52 and which is adapted to engage the stop member 66 to limit the upper movement thereof.

As set forth in detail in the application, the mechanism is operated by actuating the solenoid 68 which causes its plunger to move downwardly and flex the stop assembly 66 in the same direction so that the turntable can rotate in a direction indicated by the arrow A in FIG. 1 by means of the constantly energized motor 50. After a very small interval of turntable rotation the plunger is released by the solenoid 68 and the spring 70 causes the movable stop member 60 to flex upwardly into engagement with the abutment member 72, to maintain the stop member 66 in a precise horizontal direction. Continued rotation of the turntable 40 will result in the rod 58 engaging the stop member 66 and a repeat of the above operation will then permit the turntable to rotate until the rod 62 engages the stop member 66, and so on.

As in the case of the gyro 10, it is understood that the structural and operational details of the turntable 40 and its associated mechanism may be identical to that disclosed in the application. However, for purposes of the present aforementioned U.S. Pat. No. 3,485,115, it is understood that four equally spaced projecting rods will be provided on the turntable so that a precise stepped 90° rotation of the turntable is achieved. Also, although the turntable disclosed in the application is limited to unidirectional rotation, this is not essential in the present invention.

Figure 2:
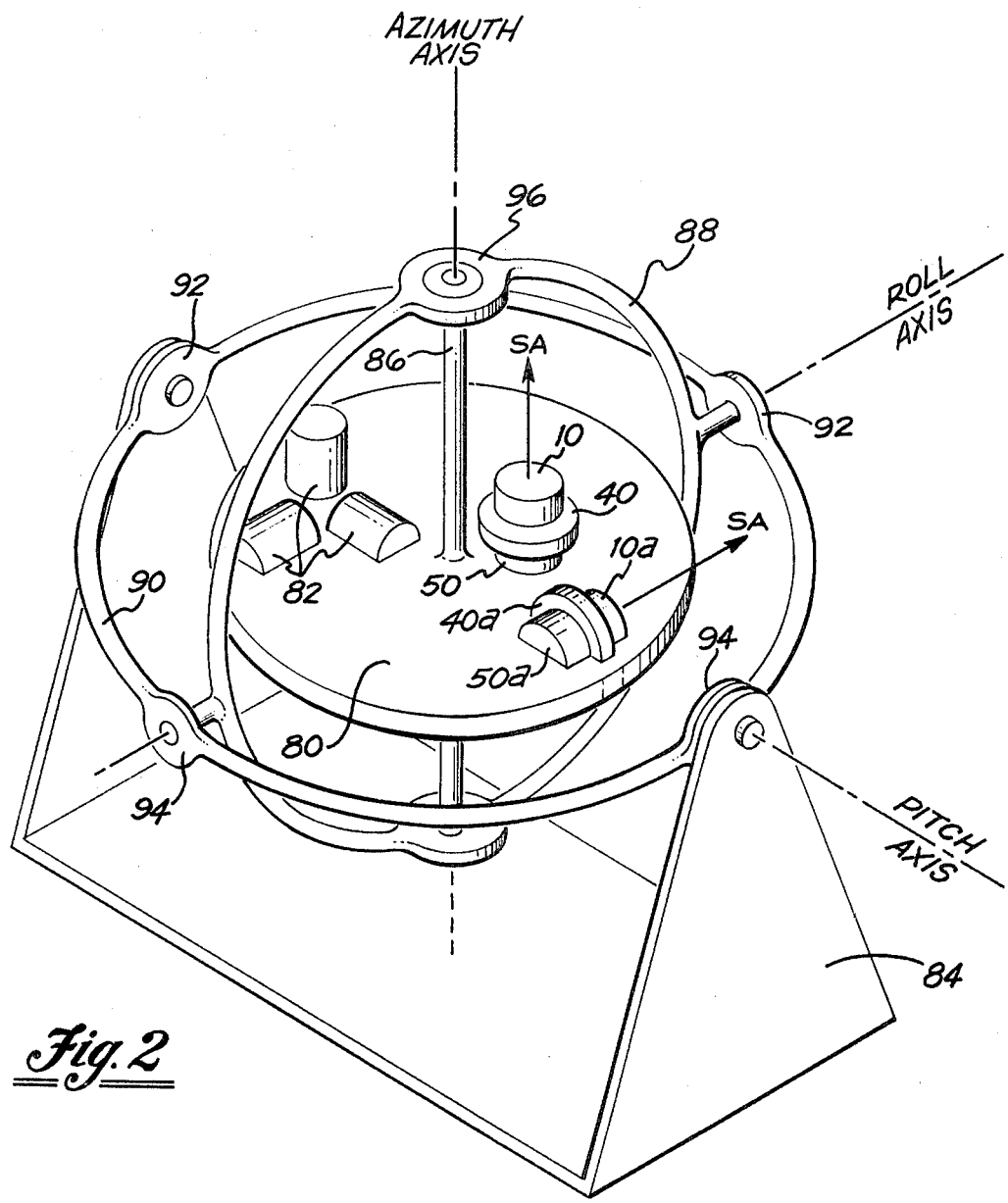
FIG. 2 is a perspective view of the gyros and turntables utilized in the present invention, mounted on a vehicle platform.

FIG. 2 discloses a pair of gyro-turntable assemblies identical to that depicted in FIG. 1 and mounted for operation according to the present invention. Specifically, the gyro 10, turntable 40, and motor 50 as well as an identical gyro 10a, turntable 40a and motor 50a, are mounted with respect to a cluster platform 80. As shown in FIG. 2, the spin axis SA of the gyro 10 extends in a vertical plane, and the turntable 40 is adapted to rotate the gyro casing about the latter axis. Similarly the turntable 40a is adapted to rotate the casing of the gyro 10a about its horizontally extending spin axis SA. A group of accelerometers 82 are also provided on the cluster platform and are arranged to permit the acceleration measurements required for navigation, in a known manner.

The cluster platform 80 is mounted with respect to a stable platform 84 by means of a vertically extending shaft 86 and a pair of gimbals 88 and 90. A pair of synchros 92 and torque motors 94, as well as a resolver 96, are provided as shown, it being understood that ball bearings are provided on the azimuth axis, the pitch axis and the roll axis to allow the gimbals to rotate with respect to each other and to the stable platform. Since the general arrangement of FIG. 2 and the functions of the various components are well known, they will not be described in any further detail.

Figure 3:
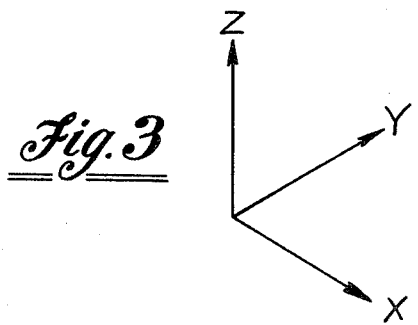
FIG. 3 depicts the reference system utilized in the system of the present invention.
Figure 4:
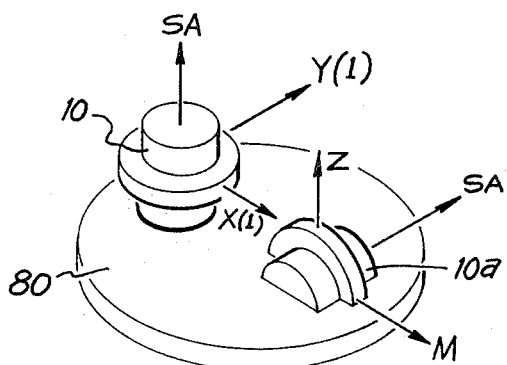
FIGS. 4—7 are diagrammatic views depicting the various positions of the casings of the gyros according to the system of the present invention.

FIGS. 4—7 are diagrammatic views of the casing and the gyro-turntable assemblies showing the various steps in the self-calibration cycle of the present invention based on the coordinate reference system depicted in FIG. 3. Specifically, in FIG. 4 the cluster platform 80 and the gyros 10 and 10a are positioned to begin the steps of determining the drift coefficients, with the spin axes of the gyros 10 and 10a extending along the z reference axis and the y reference axis, respectively. Also, the vertical gyro 10 is positioned, by means of its turntable 40, so that its x axis is in position 1. It will be apparent from FIG. 4 that since two gyros are mounted on the cluster platform and each has two input axes, a redundant, or normally unused, axis is present in the horizontal, or azimuth gyro 10a. According to the present invention this axis will be used as a monitor axis and its servo controlled loop will be modified accordingly. As shown in FIG. 4 the latter gyro 10a is positioned, by means of its turntable 40a, so that its monitor axis $m$ extends along the $x$ reference axis.

In operation, and assuming the vehicle is airborne, the torquers 30 and pickoffs 32 (FIG. 1) of each gyro will generate electrical outputs in response to earth rate compensation and drift, respectively. These outputs will be processed and directed, via a servo loop, to the torque motors 94 (FIG. 2), which, in turn, apply a torque to rotate the cluster platform 80 in the proper direction and thus apply the correction.

Assuming that the cluster platform 80 is rotated about the $x$ reference axis in accordance with the above, the following relationship is established for the vertical gyro 10:

$$\Omega_x = -\omega_{x1} + D_x \quad (1)$$

In the above equation, the subscript notation refers to the particular axis about which rotation takes place, the symbol $\Omega$ refers to the amount of rotation of the cluster platform 80, and $\omega$ refers to the torque precession rate applied to the respective gyro spin axis by means of the torquers 30, and may be defined as the product of the particular torque scale factor (in degrees/hr/ma), and the average or fitted value of the capture current for the particular axis during the sample interval, both of which may be computer stored. D refers in general to the gyro drift and includes the drift about the particular axis which is insensitive to acceleration, all other drift rates including the quadrature $g$ terms, being small enough to be neglected.

A similar relationship to equation (1) above exists for the $m$ axis of the azimuth gyro 10a:

$$\Omega_x = \omega_m + D_m \quad (2)$$

Simultaneous differencing of equations (1) and (2) and implicitly cancelling $\Omega_x$ results in the following:

$$[\omega_m - \omega_{x1}]_A = D_m - D_x \quad (3)$$

In the presence of noise and disturbance inputs, it is desirable to difference the average or fitted values of the terms on the left side of the above equation for a finite sample interval (say 20 to 100 seconds duration) in each measurement position, and this is designated by the bracket and symbol A. However, it is understood that these valves may be measured independently and differenced arithmetically.

Figure 5:
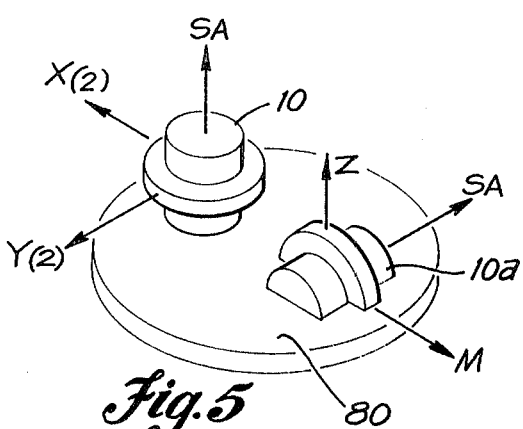

The vertical gyro casing 12 is then rotated 180° about its spin axis by means of the turntable 40, so that its $x$ axis attains position x2 as shown in FIG. 5, resulting in the following relationship:

$\Omega_x = \omega_{x2} - D_x$ (4) Equation 2 still applies for the monitor axis $m$ of the azimuth gyro 10a since its attitude is unchanged with respect to the reference frame. Therefore equations (2) and (4) can be simultaneously added and the left side term averaged for a sample interval to give the following:

$$[\omega_m + \omega_{x2}]_B = D_m + D_x \quad (5)$$

Simultaneous differencing of equations (3) and (5) results in the following expression:

$$D_x = [\omega_m ayz\omega_{x2}]_b - \frac{1}{2}\omega_m - aG_{x1}]_A \quad (6)$$

Thus, the drift rate of the vertical gyro 10 about its $x$ axis is attained in terms of computer stored signals which can be readily determined.

In order to find $D_m$ equations (3) and (5) may be simultaneously added to give the following:

$$D_m = [\omega_m ay/\omega_{x1}]aA + \frac{1}{2}[\omega_m + \omega_{x2}]_B \quad (7)$$

Thus the drift rate around the monitor axis $m$ of the azimuth gyro 10a is also determined in the terms of computer stored values.

Figure 6:
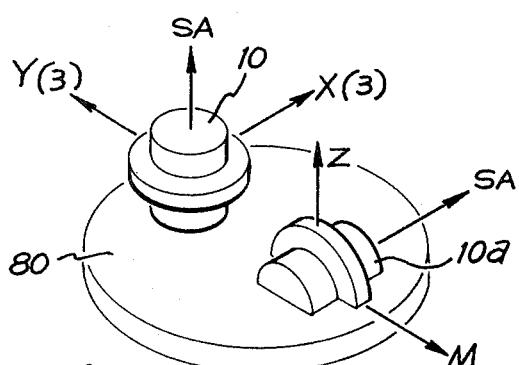

The vertical gyro casing 12 is then rotated back 90° to the position shown in FIG. 6 by means of the turntable 40, so that the following relationship can be obtained:

$$\omega_y = -\Omega_x a0/D_y \quad (8)$$

Since the attitude of the monitor axis $m$ of the azimuth gyro 10a is still unchanged with respect to the reference frame, equations (2) and (8) may be simultaneously differenced to obtain the following expression:

$$[\omega_m - \omega_y]_c = D_m + D_y \quad (9)$$

A simultaneous differencing of equations (3) and (9) results in the following:

$$[\omega_m - \omega_y a]_c = -D_x - D_y \quad (10)$$

Substituting the terms of equation (6) for $D_x$ results in the following:

$$D_y = -\frac{1}{2}[\omega_m + \omega_{x2}]_B - \frac{1}{2}[\omega_m - \omega_{x1}]_A + [\omega_m - \omega_y]_c \quad (11)$$

Thus an expression for $D_y$ is also obtained in terms of readily available information.

It is apparent from the above that, in actual practice, it will be more convenient to first rotate the casing 12 of the vertical gyro 10 to the position shown in FIG. 6 and determine the $y$ axis information before rotating it to the position of FIG. 5, but the reverse of this has been described above for convenience of presentation.

Figure 7:
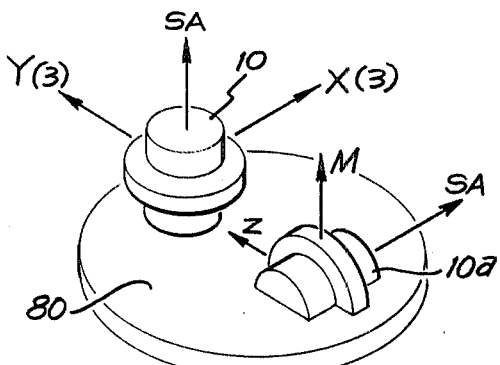

The casing of the azimuth gyro 10a is now rotated to the position of FIG. 7 by means of the turntable 40a in order to obtain the following relationship:

$$\Omega_z = D_m \quad (12)$$

It is understood that the right hand side of equation (12) will contain a stable mass unbalance drift coefficient which may be computer corrected.

Substituting the terms of equation (7) for $D_m$ results in the following:

$$\Omega_z = \frac{1}{2}[\omega A m - \omega_{x1}]_A + \frac{1}{2}[\omega A w m + \omega_{x2}]_B$$

the old $z$ axis thus now becomes the monitor axis and the monitoring operations described above in connection with FIGS. 4 through 6 are reiterated with respect to the new position of gyro 10a in FIG. 7.

This completes the determination of the drift coefficient for the three reference axes in terms of computer stored values.

It is thus seen that the system of the present invention provides a direct self-calibration of an azimuth gyro and a vertical gyro which permits the drift coefficients of the gyros to be explicitly recovered, while minimizing disturbances and reducing the cost and complexity of the system.

Of course, variations of the specific construction and arrangement of the system disclosed above can be made by those skilled in the art without departing from the invention as defined in the appended claims.

I claim:

1. An apparatus for recovering the drift coefficients of two navigational gyros for a vehicle, each of said gyros having a rotatable outer casing and two input axes, said apparatus comprising means for mounting said gyros with respect to said vehicle so that their spin axes extend at an angle to each other, means for applying a precession torque to said gyros to maintain their spin axes in a predetermined spatial position, and means for rotating the casing of each gyro about an axis parallel to its spin axis to predetermine angular positions, to permit a respective drift coefficient to be established for at least three of the input axis common to said two gyros, said means for mounting said gyros comprising a vehicle platform stabilized with respect to said three axes, and said means for rotating the casing of each gyro comprises a turntable means rotatably mounted on said platform and having stop means engageable therewith to define said predetermined angular positions.

2. The apparatus of claim 1 wherein the spin axes of said gyros extend at a 90° angle to each other.

3. The apparatus of claim 1 wherein each of said gyro casings is attached to each of said turntable means for rotation therewith respectively, and said engaging means comprises a projecting means extending from said turntable, said means for rotating each gyro casing further comprising means for supporting said turntable for rotation about an axis coinciding with the spin axis of each respective gyro so that said projecting means moves in a generally circular path, stop means carried by said support means and extending in said path to engage said projecting means to stop said turntable after a predetermined angular rotation thereof, and means selectively operable to move said stop means out of said path to permit further rotation of said turntable.